UNITED STATES PATENT OFFICE.

ALONZO FARRAR, OF LONGWOOD, MASSACHUSETTS.

IMPROVED PROCESS OF OBTAINING USEFUL OIL FROM THE ACID RESIDUUM OF PETROLEUM.

Specification forming part of Letters Patent No. 96,097, dated October 26, 1869.

*To all whom it may concern:*

Be it known that I, ALONZO FARRAR, of Longwood, in the county of Norfolk and State of Massachusetts, have made a new and useful invention or process of treating the oil derived from the purification of sulphuric acid after having been used in refining petroleum; and I do hereby declare the same to be described as follows:

On June 14, 1864, Letters Patent of the United States No. 43,157 were granted to myself and Robert G. Loftus for a process of removing the sulphuric acid in refining petroleum. In treating the said acid by the said patented process there is an oily residuum left, which has an odor so offensive as to render it of little or no practical value, the said odor being a bar to its use in the arts. I have discovered a method of utilizing the said residuum, or of depriving it of its disagreeable odor, and of improving it in such manner as to render it fit for use for several purposes in the arts. It is especially useful in making liquid paints or printers' ink.

In carrying out the said process or invention a quantity of the said residuum—say one hundred gallons—is to be taken, and is to have mixed with it from one to two gallons of a solution of caustic soda of about 15° Baumé. The mixture should be thoroughly agitated, and afterward be allowed to settle. Next the mixture drawn off or separated from the impurities left by the alkaline solution is to be put into a still or open kettle, and with it there should be incorporated about twenty pounds of lime and about ten gallons of water. Heat should be applied to the still or kettle, so as to put the mixture in ebullition and distill off or evaporate from it more or less of the water, which will carry off the offensive matters set free by the lime. After having thus treated the substance in the kettle or still, or having reduced it to the proper consistency, the impurities left in it should be allowed to settle, and should be separated from it by drawing or otherwise separating the liquid from them. The said liquid product or resultant is a new or improved article of manufacture of much value for the purposes set forth.

I do not confine the process to the employment of lime only, as there may be other matters or alkalines which may have an equivalent effect or effects when used with the water and heat; nor do I confine my invention to the precise proportion of the lime, soda, and water used with the matter to be heated, as these may be varied more or less and still be productive of the necessary effects.

I am aware of Millochan's process of refining oil, as described in Letters Patent No. 37,918, dated March 17, 1863, and reissued May 19, 1863. This, though in some respects analogous to my process, differs materially from it in others. In the first place his process relates to the oil containing the spent acid, whereas my process has reference to the residuum obtained after pressing the oil from the spent acid by the process described in Letters Patent No. 43,157. Millochan heats the oil by simply mixing with it about forty per cent. of water and agitating the mixture for about two hours, such being to remove the acid, after which he allows the liquid to settle, and subsequently draws off the water and acid, after which he mixes with the oily portion about twenty per cent. of caustic soda or alkali and stirs or shakes the whole mass for about an hour. The remaining acid will then have been neutralized. The liquid is next allowed to settle for twelve hours, after which the supernatant oil is drawn off. He states that during the operation the oil may be exposed to a moderate steam or other heat, which will improve it. In no respect does he resort to a process of distillation to evaporate the water and carry off the offensive matters set free by the alkali. While he employs a "moderate steam or other heat," I heat the liquid mass to ebullition, and keep it so until I evaporate from it the water, and by the steam produced carry off the offensive odorous matters set free by the lime. Thus I deodorize the oily matter, which he does not.

I claim—

1. My new process, substantially as described, for treating the oily residuum obtained in the purification of the spent acid, as above mentioned.

2. As a new or improved manufacture, the deodorized oily product resulting from the employment of such process, in manner as set forth.

ALONZO FARRAR.

Witnesses:
R. H. EDDY,
S. N. PIPER.